United States Patent [19]

Crist

[11] Patent Number: 4,688,652
[45] Date of Patent: Aug. 25, 1987

[54] BRAZE FIXTURES FOR USE IN DRILLING TOOLS

[75] Inventor: Owen K. Crist, Bedford, Pa.

[73] Assignee: Kennametal Inc., Latrobe, Pa.

[21] Appl. No.: 248,406

[22] Filed: Mar. 27, 1981

[51] Int. Cl.[4] .................. B23C 1/04; B23C 35/14; E21B 10/58

[52] U.S. Cl. ..................... 175/410; 76/108 A; 228/212; 228/135; 228/254; 408/144

[58] Field of Search ............. 228/135, 136, 182, 253, 228/254, 255, 251, 212, 56; 408/144, 145; 76/101 A, 101 E, 102, 103, 108 R, 108 A, 108 T; 125/5; 175/411, 410

[56] References Cited

U.S. PATENT DOCUMENTS 1,956,233  4/1934  Braun ........................... 228/254 X
3,960,310  6/1976  Nussbaum ..................... 228/212 X
4,032,057  6/1977  Linscott, Jr. ................... 228/255 X
4,143,723  3/1979  Schmotzer ..................... 408/144 X
4,330,044  5/1982  Orr et al. ........................... 175/410
4,356,873  11/1982 Dziak ........................... 76/108 R X

FOREIGN PATENT DOCUMENTS 664983  1/1952  United Kingdom .
668810  3/1952  United Kingdom .

Primary Examiner—Stephen J. Novosad
Attorney, Agent, or Firm—John J. Prizzi

[57] ABSTRACT

A braze fixture is described having appendages for holding a first component substantially fixed in a predetermined portion with respect to a second component during a brazing operation in which the first component is brazed to the second component.

5 Claims, 9 Drawing Figures

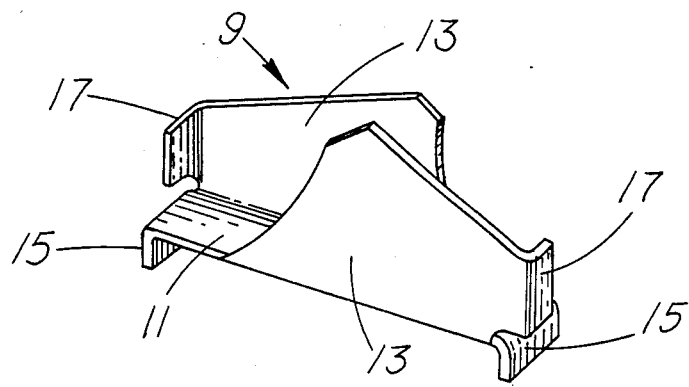
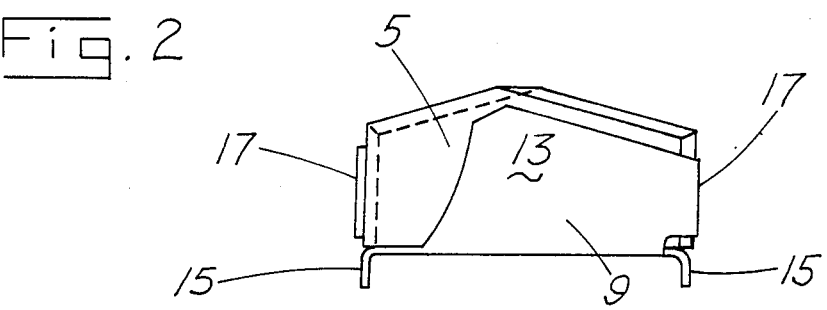
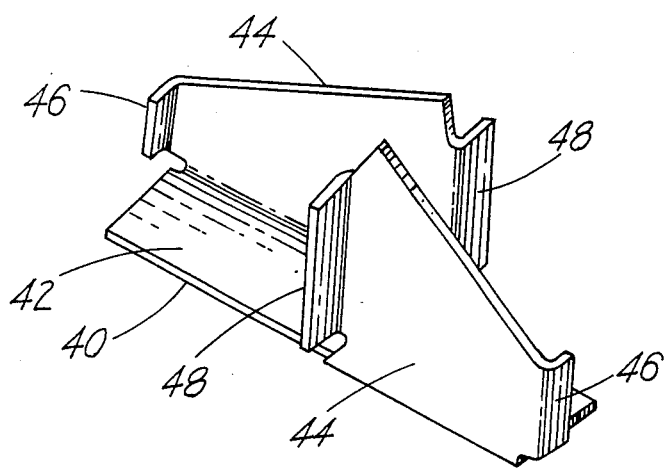
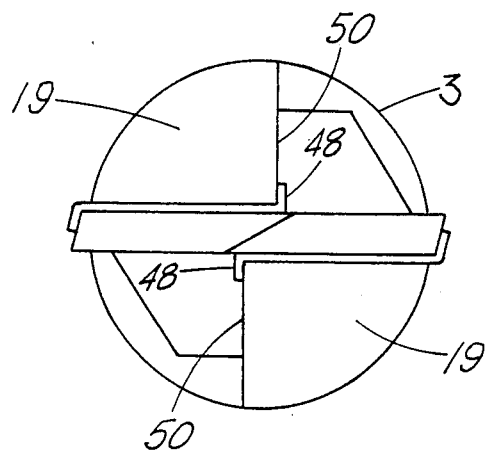

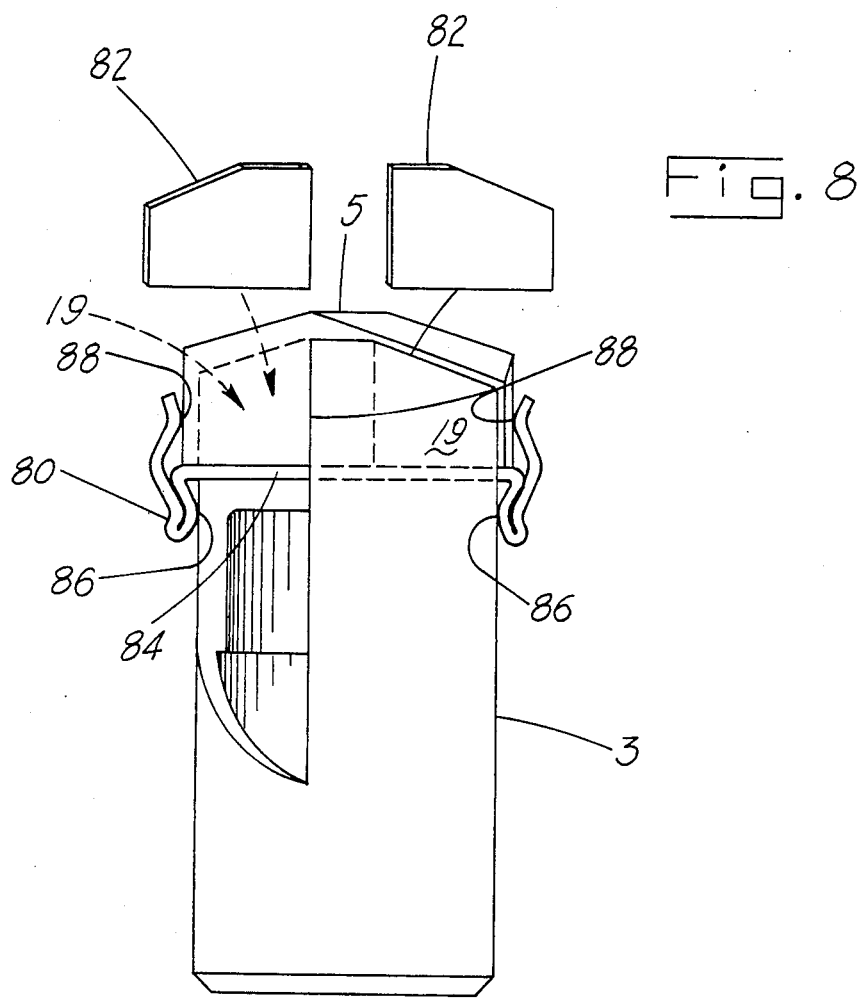
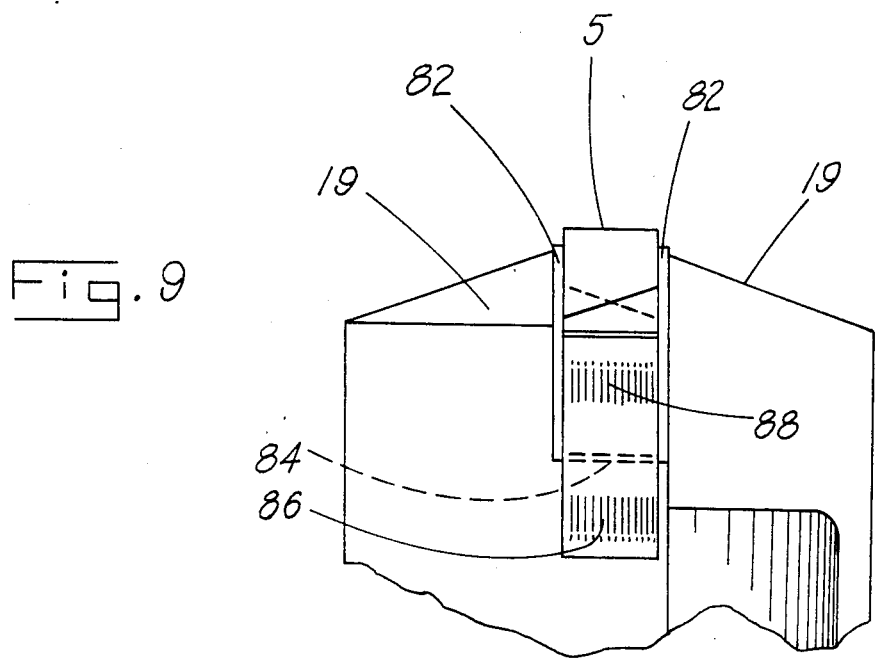

BRAZE FIXTURES FOR USE IN DRILLING TOOLS

BACKGROUND OF THE INVENTION

This invention relates to the field of brazing and brazed tools. More specifically, it relates to braze fixtures and their use to braze components together and, also, maintain the components being joined in a desired relationship with respect to one another during automatic brazing operations.

It is well known to form cutting tools having a working end and a shank by brazing a hard wear resistant insert, such as cemented carbide, onto the working end of a shank made of a softer but tougher material, such as steel. In some cases, the configuration of the mating faces on the insert and the shank act to maintain the relative positions of the two components during brazing. However, in many cases, the design of the tool or components will let relative movement between the components take place during brazing unless external fixturing is applied to maintain the alignment of the pieces.

It is this later situation with which this invention is concerned. During automated brazing operations, the braze material between the insert and the tool body is brought to a molten state at a first station, for example, by induction heating. The tool is then moved to a second station for cooling or quenching. During this movement from the first to second station, while the braze material is still at least partially molten, relative movement between the insert and the tool body can easily occur.

In the past, attempts to solve this problem resulted in the use of an external transfer fixture which held the insert in alignment with the tool body while the assembly was being transferred from the heating to the cooling station. This solution, however, introduced a new problem. It was found that the flux that coated the tool body, insert and braze material to prevent contamination would build up on the external fixturing and thereby prevent the fixture from properly engaging the insert and tool body. To avoid this, the automatic brazing process had to be periodically shut down in order to clean the flux off the fixture.

BRIEF SUMMARY OF THE INVENTION

The present invention has solved the aforementioned brazing problem through the use of a novel braze fixture to maintain the positions of the two components being brazed without external fixturing. The fixture according to the present invention becomes an integral part of the brazed components. In the braze fixture according to the present invention, a first tab means extends therefrom and abuts against the tool body so as to maintain the position of the braze fixture and the hard wear resistant insert held within it during brazing.

In addition, a second tab means extends from said fixture so as to hold the insert substantially fixed within the fixture during brazing.

In accordance with the present invention, cutting tools may be brazed simply by: snapping a hard wear resistant insert into a fixture; snapping the fixture onto a tool body; and brazing the resulting assembly. External fixturing is not required during automatic brazing since the tab means utilized have sufficient structural strength at the brazing temperature to maintain the position of the insert relative to the tool body even while the braze is molten.

In a preferred embodiment, the fixture is a folded metallic sheet having two materials with dissimilar melting points. The lower melting temperature material is the braze material, while the higher melting temperature material maintains the position of the insert relative to the tool body at the brazing temperature.

In an alternate preferred embodiment, the fixture is comprised of a spring clip and brazing means separate from the spring clip.

The aforementioned fixture and process results in a novel cutting tool having a hard wear resistant insert brazed to a tool body in which the tab means on the braze fixture extend away from the insert while abutting against the tool body.

It is, therefore, an object of the present invention to provide a novel braze fixture having means to maintain the relative positions of the components being brazed during brazing.

An additional objective of the present invention is to provide a simple and less expensive method of brazing cutting tools.

A further objective of the present invention is to provide high quality cutting tools utilizing the aforementioned fixtures.

BRIEF DESCRIPTION OF THE DRAWINGS

The exact nature of the present invention will become more apparent upon review of the following detailed description of the invention in conjunction with the drawings:

FIG. 1 is an isometric view of a braze fixture according to the present invention.

FIG. 2 is a side view of the fixture shown in FIG. 1 with a hard wear resistant insert held within it.

FIG. 4 is an alternate embodiment of the braze fixture shown in FIG. 1.

FIG. 5 is a top view of the cutting tool shown in FIG. 3, utilizing the fixture shown in FIG. 4.

FIG. 8 is an alternate embodiment of a cutting tool according to the present invention having an alternate fixture according to the present invention.

FIG. 9 is a view of the embodiment shown in FIG. 8, rotated 90 degrees from the FIG. 8 view.

DETAILED DESCRIPTION OF THE INVENTION

Figure 3:
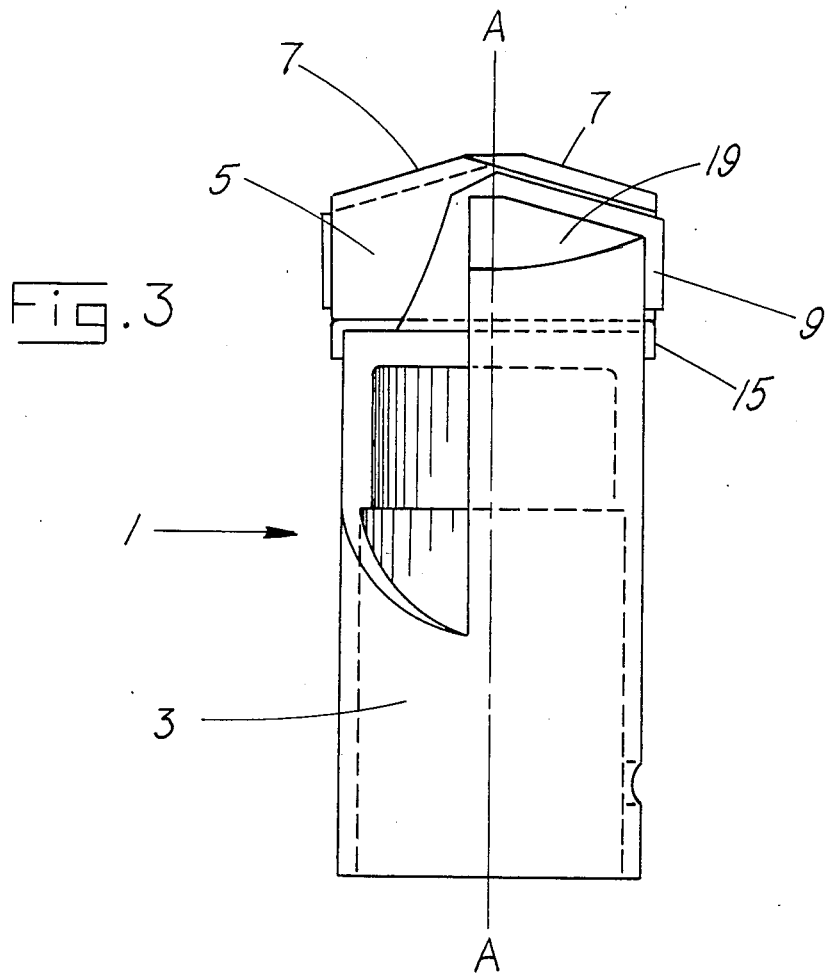
FIG. 3 is a side view of a cutting tool according to the present invention utilizing the braze fixture shown in FIG. 1.

Referring to the drawings for a more detailed description of the invention, FIG. 3 shows a rotary drill bit 1. The tool is designed to rotate about its axis A. It has an insert 5 mounted on the working end of its body 3 between two prongs 19. The insert has two cutting edges 7 which slope rearwardly as they extend radially outwardly. It can clearly be seen that this rotary drilling tool 1 will perform most efficiently if the insert 5 is centered about the axis A about which it rotates.

As mentioned in the background, tools of this type did not have integral means for maintaining the insert 5 in the desired position during the brazing operation.

As can be seen in FIG. 3, in this invention, a braze fixture 9 having means for maintaining the position of the insert 5 with respect to tool body 3 is provided.

Referring now to FIG. 1 for a more detailed look at the braze fixture 9 according to the present invention, it can be seen that it comprises a piece of sheet metal which has been bent and folded so as to attain a base portion 11 which is substantially flat. Extending on either side of the base portion 11 are arms 13. These arms extend substantially perpendicular to the plane of the base portion 11. On opposite ends of the arms 13 are tabs or wings 17 which angularly extend from said arms above and beyond the ends of the base portion 11.

These tabs are positioned so as to receive a hard wear resistant insert between them and keep the insert substantially in a fixed position. Extending downwardly from the ends of the base portion 11 are tangs or tabs 15. The tabs 15 are spaced apart from one another by a distance approximately equal to, or slightly less than, the diameter of the tool body 3.

Referring now to FIG. 2, it can be seen that the hard wear resistant insert 5 is slipped into the fixture 9 such that it is held substantially fixed between the arms 13 on its sides and the tabs 17 on its ends. It can be seen that the tangs 15 do not substantially extend beyond the outer ends of the insert 5 and extend from the base portion 11 at approximately 90 degrees.

Referring once again to FIG. 3, it can be seen that this assembly of hard wear resistant insert 5 and braze fixture 9 is slid between two prongs 19 on the working end of the tool body 3. One prong 19 is shown in the drawing, and the other prong 19 is hidden behind the cutting insert 5 and is located in the quadrant opposite to that in which the visible prong is located.

It can be seen in this drawing that the tabs 15 are sized such that they slide over the outer dimension of the tool body 3 and abut against it so as to set the insert 5 in a predetermined position on the tool body 3 and thereby center the insert about the axis of rotation A.

Once this assembly has been made, the insert 5, fixture 9 and the working end of the tool body 3 are covered with flux, heated to the brazing temperature and then cooled or quenched. The fixture 9, according to this invention, allows this brazing operation to be done in a fully automatic manner. Since no external fixturing is required to maintain the position of the insert 5 with respect to the tool body 3, while the braze material is molten, the brazing operation does not have to be halted to clean flux off such external fixturing.

In a preferred embodiment, the fixture 9 is made of two materials having dissimilar melting points. The first material, having a lower melting point, is the braze material, and the second material, having the higher melting point, maintains sufficient strength at the melting point to maintain the insert 5 at the tool body 3 while the braze material is molten. Most preferably, this fixture 9 is made of a sheet material in which the higher melting point material is surrounded on both sides by the braze material.

Referring to FIG. 4, this shows an alternate embodiment of the fixture shown in the preceding figures. This fixture 40 also has a base portion 42. Extending from both sides of the base portion 42 are arms 44 which extend upwardly substantially perpendicular to the plane of the base portion 42. Located at the outer ends of arms 44 are tabs 46 which serve to locate the insert in the fixture 40 just as the tab 17 did in the embodiment shown in FIGS. 1 and 2.

The fixture 40, however, differs from the fixture 9 in that the tabs used to set the fixture and the insert in the proper location on the body of the tool are not located on opposite ends of the base portion, but are located on the arms 44.

As can be seen in FIG. 4, these tabs 48 extend outwardly from the inner edge of the arms 44 and are designed to abut the substantially vertical surfaces 50 on the prongs 19 of the tool body 3 as shown in FIG. 5.

Figure 7:
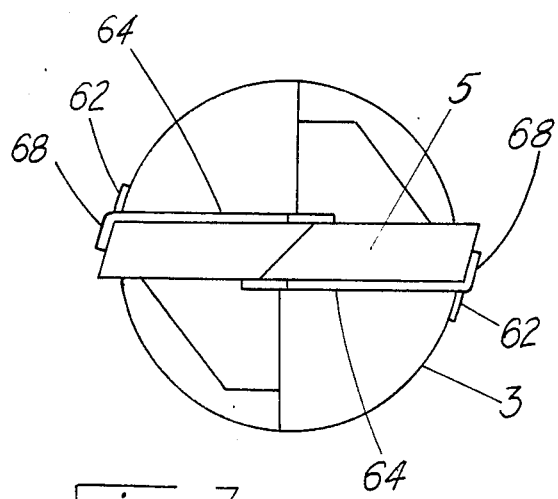
FIG. 7 is a top view of the cutting tool shown in FIG. 3, utilizing the fixture shown in FIG. 6.
Figure 6:
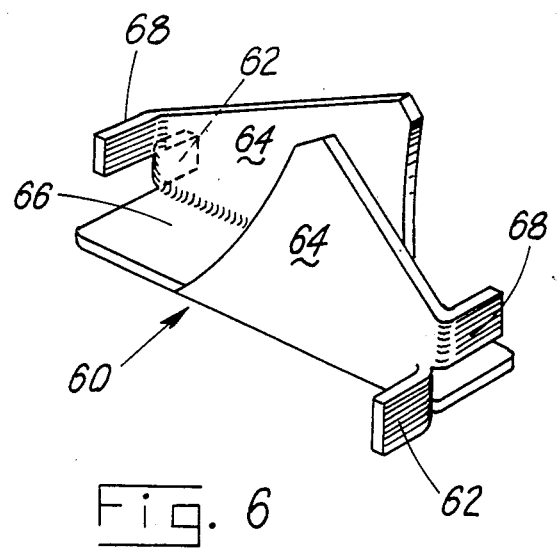
FIG. 6 is another example of a braze fixture according to the present invention.

Another example of a braze fixture is shown in FIG. 6. In this fixture 60, the tabs on the ends of the base portion have been replaced by tabs 62 on the outer ends of arms 64. Tabs 62 extend laterally away from the base portion 66 and arms 64 and in the direction opposite to tabs 68 which abut the ends of the insert 5. As can be seen in FIG. 7, tabs 62 are located radially inwardly of tabs 68 and abut the outer periphery of the tool body 3 thereby centering the fixture and the insert on the tool body 3.

In the brazing process, the tabs 17, 46, or 68 are brazed to the outer ends of the insert 5. They may be subsequently ground off since they have served their purpose and will, if left on, wear away rapidly during drilling.

FIGS. 8 and 9 show an alternate preferred embodiment of the cutting tool and fixture according to the present invention. The fixture in this embodiment is comprised of a spring clip 80 and separate sheets 82 of braze material. The spring clip 80 comprises a flat base portion 84 having tabs formed at its ends. The tabs are formed by folding so as to produce downwardly extending tabs 86 for resiliently abutting the outer diameter of the tool body 3 and upwardly extending tabs 88 for resiliently abutting the ends of a hard wear resistant insert 5 held between the tabs 88. The assembly of insert 5 and spring clip 80 is positioned between prongs 19 on the working end of the tool body 3. Interposed between the prongs 19 and the spring clip 80/insert 5 assembly are sheets 82 of braze material. Sheets 82 preferably comprise a higher melting point inner layer covered with lower melting point outer layers. The spring clip 84 is preferably made from spring steel sheet metal. After brazing is completed, the tabs 88 and 86 may be removed, leaving the insert 5 and flat portion 84 brazed between prongs 19 by brazing sheets 82.

Modifications may be made within the scope of the appended claims.

What is claimed is:

1. A braze fixture for joining a first component to a second component comprising: a first means for holding said first component within said fixture in a first predetermined position during brazing; and a second means for holding said fixture to said second component in a second predetermined position during brazing, wherein said first and second means comprise a spring clip; and said fixture further comprises brazing means separate from said spring clip.

2. A braze fixture for positioning a first component with respect to a second component comprising: a substantially flat base portion; a pair of arms extending substantially perpendicular to the plane of said base portion and on either side thereof; a first and a second tab angularly extending from opposite ends of each of said arms, said first tab extending inwardly above and beyond an end of said base portion, said second tab extending outwardly from said base portion, said first and second tabs having oppositely facing abutment faces separated by a distance less than the longest dimension of said base portion; and wherein the first component is fixedly positioned between the respective first tab abutment faces and the respective second tab abutment faces abut the second component so that the first component is now in a predetermined position with respect to the second component.

3. A braze fixture for positioning a first compoent with respect to a second component comprising: a substantially flat base portion; a pair of arms extending perpendicular to the plane of said base portion and on either side thereof; each arm having a first and a second tab angularly extending from the same end of said arm but in opposite directions with respect to said base portion, said first tab extending inwardly above and beyond an end of said base portion, said second tab extending outwardly from said base portion, said first and second tabs having abutment faces facing in the same general direction; and wherein the first component is fixedly positioned between the respective first tab abutment faces and the respective second tab abutment faces abut the outer periphery of the second component so that the first component is now in a predetermined position with respect to the second component.

4. A drilling tool comprising: a body having a working end; prongs extending from said working end and forming a slot therebetween; a hard wear resistant insert; a braze fixture brazed to said prongs and to said insert; wherein said braze fixture comprises: a substantially flat base portion; a pair of arms extending substantially perpendicular to the plane of said base portion and on either side thereof; a first and a second tab angularly extending from opposite ends of each of said arms, said first tab extending inwardly above and beyond an end of said base portion, said second tab extending outwardly from said base portion, said first and second tabs having oppositely facing abutment faces separated by a distance less than the longest dimension of said base portion; and wherein said insert is fixedly positioned between the respective first tab abutment faces and the respective second tab abutment faces abut said prongs so that said insert is now in a predetermined position with respect to said prongs.

5. The braze fixture according to claims 2, 3, or 4 further comprising folded sheet metal comprising two materials with dissimilar melting points, an inner layer and outer layers wherein the outer layers are braze material and the inner layers is a higher melting point material which retains its strength at the brazing temperature.

* * * * *